US010174482B2

United States Patent
Todokoro (10) Patent No.: US 10,174,482 B2
(45) Date of Patent: Jan. 8, 2019

(54) CONSTRUCTION MACHINE

(71) Applicant: Hitachi Construction Machinery Co., Ltd., Taito-ku, Tokyo (JP)

(72) Inventor: Yuichi Todokoro, Abiko (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 15/399,794

(22) Filed: Jan. 6, 2017

(65) Prior Publication Data

US 2017/0268200 A1 Sep. 21, 2017

(30) Foreign Application Priority Data

Mar. 15, 2016 (JP) ................................ 2016-050565

(51) Int. Cl.
| | | |
|---|---|---|
| *F01P 5/06* | (2006.01) | |
| *B60K 13/04* | (2006.01) | |
| *F01P 11/10* | (2006.01) | |
| *E02F 9/18* | (2006.01) | |
| *B60K 11/08* | (2006.01) | |

(Continued)

(52) U.S. Cl.
CPC ............ *E02F 9/0866* (2013.01); *B60K 11/02* (2013.01); *B60K 11/06* (2013.01); *B60K 11/08* (2013.01); *B60K 13/02* (2013.01); *B60K 13/04* (2013.01); *E02F 9/0808* (2013.01); *E02F 9/0891* (2013.01); *E02F 9/18* (2013.01); *E02F 9/24* (2013.01); *F01P 5/06* (2013.01); *F01P 11/10* (2013.01); *E02F 3/32* (2013.01)

(58) Field of Classification Search
CPC .. B60K 11/06; B60K 11/08; F01P 5/06; F01P 11/10
See application file for complete search history.

(56) References Cited

U.S. PATENT DOCUMENTS

| | | | | |
|---|---|---|---|---|
| 4,189,020 A | * | 2/1980 | Abels ..................... | B60K 11/08 180/68.1 |
| 5,678,512 A | * | 10/1997 | Colton .................... | F01P 11/10 123/2 |
| 6,745,860 B2 | | 6/2004 | Yabe | |

(Continued)

FOREIGN PATENT DOCUMENTS

| | | |
|---|---|---|
| CN | 104712004 A | 6/2015 |
| EP | 1 637 710 A1 | 3/2006 |

(Continued)

OTHER PUBLICATIONS

Extended Search Report issued in counterpart European Application No. 17150409.5 dated Jul. 14, 2017 (9 pages).

*Primary Examiner* — James A Shriver, II
*Assistant Examiner* — Vaughn Coolman
(74) *Attorney, Agent, or Firm* — Crowell & Moring LLP (57) ABSTRACT

A firewall (11) is provided as a partition between an engine room (25) in which an engine (7) and an exhaust gas post-treatment device (10) are arranged and a pump room (26) in which a hydraulic pump (8) is arranged. A rear surface plate (13) of the firewall (11) is provided with an outflow opening (28) for causing cooling air sucked into the engine room (25) to flow out toward a counterweight (6). Aright weight part (6C) of the counterweight (6) is provided with an exhaust opening (29) in a position facing the outflow opening (28) for causing cooling air having flowed out from the outflow opening (28) to be discharged to an exterior.

3 Claims, 8 Drawing Sheets

(51) Int. Cl.
*E02F 9/08* (2006.01)
*B60K 11/02* (2006.01)
*B60K 13/02* (2006.01)
*E02F 9/24* (2006.01)
*B60K 11/06* (2006.01)
*E02F 3/32* (2006.01)

(56) References Cited

U.S. PATENT DOCUMENTS

| | | | | |
|---|---|---|---|---|
| 8,215,434 | B2* | 7/2012 | Matsushita | B62D 49/085 |
| | | | | 180/68.1 |
| 8,540,042 | B2* | 9/2013 | Atarashi | B60K 1/04 |
| | | | | 180/68.1 |
| 8,550,198 | B2* | 10/2013 | Isaka | B60K 11/04 |
| | | | | 180/291 |
| 8,573,646 | B2* | 11/2013 | Kamiya | B60K 13/04 |
| | | | | 180/89.2 |
| 2009/0283346 | A1* | 11/2009 | Katae | B60K 1/04 |
| | | | | 180/68.2 |
| 2010/0219008 | A1 | 9/2010 | Isaka et al. | |
| 2013/0319787 | A1* | 12/2013 | Kobayashi | E02F 9/0866 |
| | | | | 180/309 |

FOREIGN PATENT DOCUMENTS

| | | |
|---|---|---|
| EP | 2 679 426 A1 | 1/2014 |
| JP | 2003-20679 A | 1/2003 |
| JP | 3386652 B2 | 3/2003 |
| JP | 2006-291537 A | 10/2006 |
| JP | 2008-231694 A | 10/2008 |
| WO | WO 2009/104592 A1 | 8/2009 |
| WO | WO-2015115181 A1 * | 8/2015 ............ B60K 13/04 |

* cited by examiner

CONSTRUCTION MACHINE

TECHNICAL FIELD

The present invention relates to construction machines such as a hydraulic excavator provided with a counterweight and an engine in rear of a vehicle body frame, for example.

BACKGROUND ART

In general, a hydraulic excavator as a representative example of construction machines is configured with an automotive lower traveling structure, an upper revolving structure that is mounted on the lower traveling structure to be capable of revolving thereon and a front device that is mounted on the upper revolving structure to be capable of tilting and lifting thereto.

The upper revolving structure of the hydraulic excavator comprises a vehicle body frame that is formed as a support structure, a counterweight that is provided to extend in a left-right direction of the vehicle body frame in the rear end to the vehicle body frame for acting as a weight balance to the front device, an engine that is positioned in the front side to the counterweight and is mounted on the vehicle body frame in a horizontal state of extending in the left-right direction, a hydraulic pump that is provided in the engine to be positioned in one side of the left-right direction of the vehicle body frame, an exhaust gas post-treatment device that is connected to an exhaust gas side of the engine to be positioned above the hydraulic pump and performs post-treatment of an exhaust gas discharged from the engine, a firewall that is provided as a partition between an engine room in which the engine and the exhaust gas post-treatment device are arranged and a pump room in which the hydraulic pump is arranged, a cooling fan that is provided in the engine room to be positioned on the other side of the left-right direction of the vehicle body frame and sucks in outside air as cooling air, a heat exchanger that is provided on the vehicle body frame to face the cooling fan and cools fluid by the sucked cooling air, and an exterior cover that is positioned in front of the counterweight to cover the engine, the hydraulic pump, the exhaust gas post-treatment device and the heat exchanger (Patent Document 1).

Here, when the hydraulic excavator is activated to rotate the cooling fan, the outside air is supplied to the heat exchanger through an opening of the exterior cover. Thereby, the heat exchanger can cool fluid such as engine cooling water and hydraulic oil with the cooling air by the cooling fan.

PRIOR ART DOCUMENT

Patent Document

Patent Document 1: Japanese Patent Laid-Open No. 2003-20679 A

SUMMARY OF THE INVENTION

Incidentally, in recent hydraulic excavators, the exhaust gas post-treatment device is large-sized with the tightening of the exhaust gas regulations. In addition, the exhaust gas post-treatment device is wholly complicated along with an increase of sensors to be mounted. In this case, the large-sized exhaust gas post-treatment device is made higher in heat quantity to cause a wide range of the periphery to be high in temperature. Therefore, the sensors are unfortunately caused to rise in temperature by the heat of the exhaust gas post-treatment device.

The present invention is made in view of the aforementioned problems in the conventional arts, and an object of the present invention is to provide a construction machine that can cool an exhaust gas post-treatment device with circulation of cooling air within an engine room.

In order to solve the aforementioned problems, a construction machine according to the present invention comprises: a vehicle body frame that is formed as a support structure; a counterweight that is provided to extend in a left-right direction of the vehicle body frame in the rear end to the vehicle body frame for acting as a weight balance to a front device; an engine that is positioned in the front side to the counterweight and is mounted on the vehicle body frame in a horizontal state of extending in the left-right direction; a hydraulic pump that is provided in the engine to be positioned in one side of the left-right direction of the vehicle body frame; an exhaust gas post-treatment device that is connected to an exhaust gas side of the engine to be positioned above the hydraulic pump and performs post-treatment of an exhaust gas discharged from the engine; a firewall that is provided as a partition between an engine room in which the engine and the exhaust gas post-treatment device are arranged and a pump room in which the hydraulic pump is arranged; a cooling fan that is provided in the engine room to be positioned on the other side of the left-right direction of the vehicle body frame and sucks in outside air as cooling air; a heat exchanger that is provided on the vehicle body frame to face the cooling fan and cools fluid with the cooling air sucked by the cooling fan; and an exterior cover that is positioned in front of the counterweight to cover the engine, the hydraulic pump, the exhaust gas post-treatment device and the heat exchanger, characterized in that: an outflow opening for outflow of the cooling air sucked in the engine room toward the counterweight is provided with the firewall, and an exhaust opening in a position facing the outflow opening to discharge the cooling air flowing out from the outflow opening to an exterior is provided with the counterweight.

According to the present invention, it is possible to cool the exhaust gas post-treatment device with circulation of cooling air within an engine room.

MODE FOR CARRYING OUT THE INVENTION

Hereinafter, a construction machine according to an embodiment in the present invention will be in detail explained with reference to FIG. 1 to FIG. 8, by taking a wheel type hydraulic excavator as a representative example.

Figure 1:
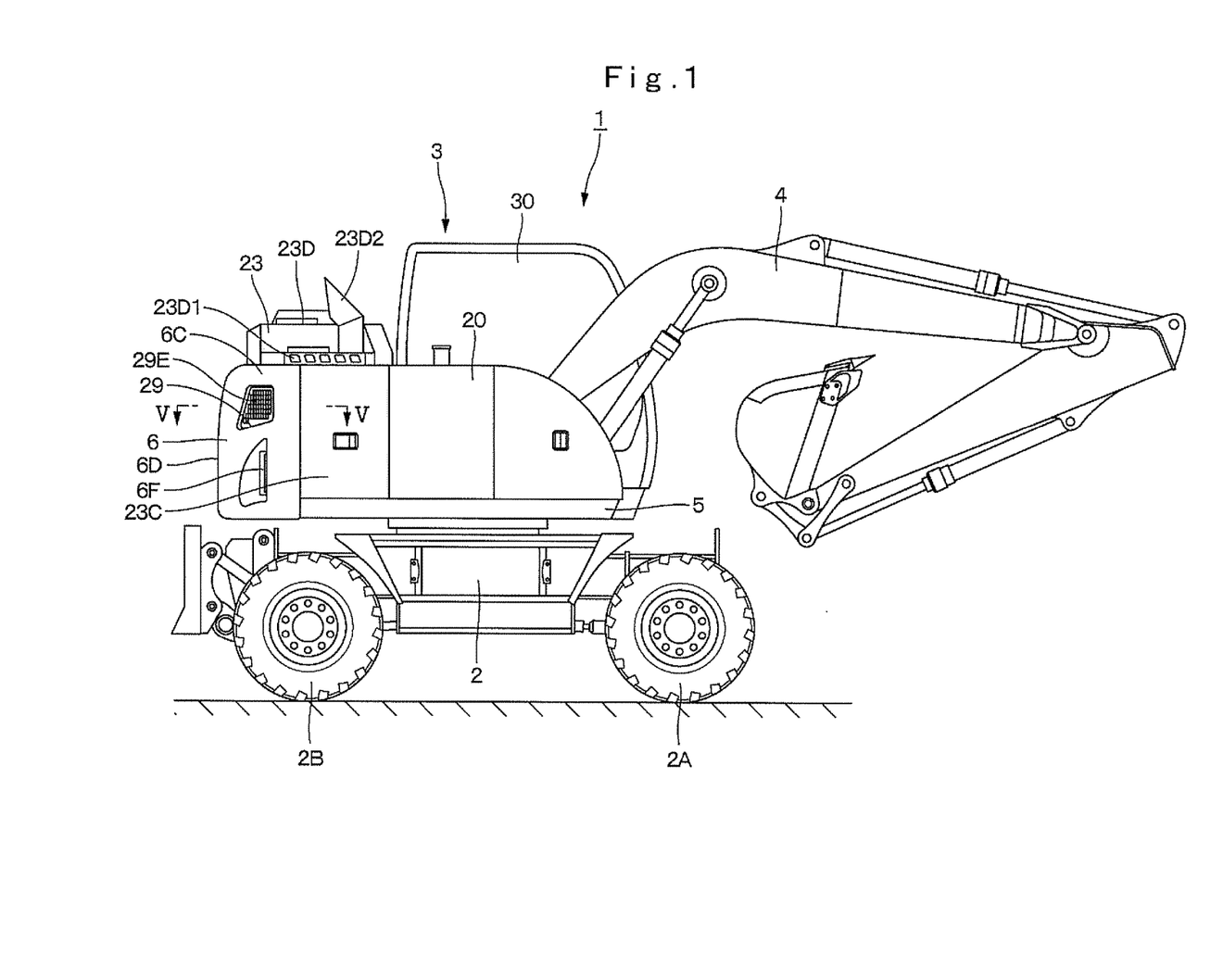
FIG. 1 is a side view showing a wheel type hydraulic excavator according to an embodiment in the present invention.

In FIG. 1, a wheel type hydraulic excavator 1 is provided with an automotive wheel type lower traveling structure 2 having left and right front wheels 2A and left and right rear wheels 2B (only the right wheel is shown in both of the front and rear wheels). The hydraulic excavator 1 includes the lower traveling structure 2, an upper revolving structure 3 that is mounted on the lower traveling structure 2 to be capable of revolving thereon and a front device 4 that is provided on the front side in the upper revolving structure 3 to be capable of lifting and tilting thereto.

Figure 2:
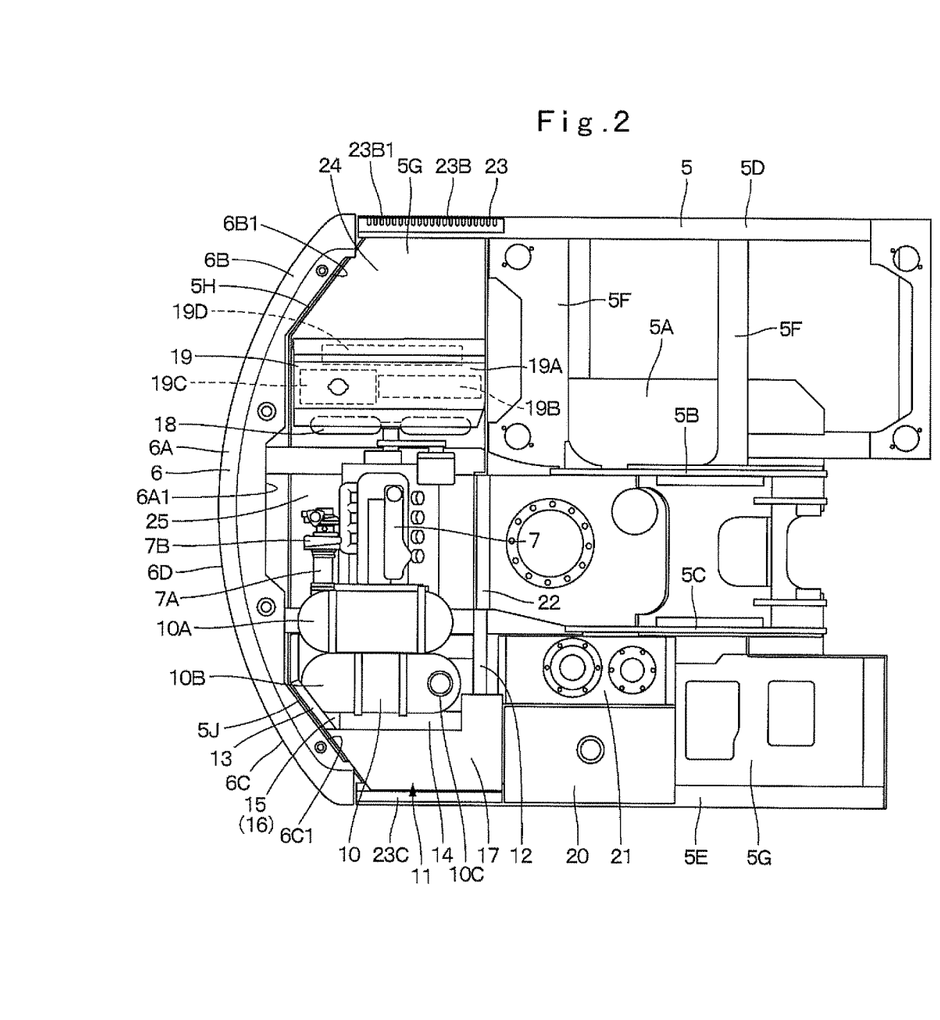
FIG. 2 is a plan view showing a revolving frame, a counterweight, an engine, a heat exchanger, an exhaust gas post-treatment device and the like of an upper revolving structure with an exterior cover and a cab being removed.

A revolving frame 5 is formed as a support structure of the upper revolving structure 3, and constitutes a vehicle body frame by the present invention. The revolving frame 5 is mounted on the lower traveling structure 2 to be capable of revolving thereon, and the front device 4 is mounted on the front side of the revolving frame 5. As shown in FIG. 2, the revolving frame 5 includes a bottom plate 5A composed of a thick steel plate extending in the front-rear direction and the like, a left vertical plate 5B and a right vertical plate 5C that are provided to rise on the bottom plate 5A and extend in the front-rear direction at a predetermined interval in a left-right direction, a left side frame 5D and a right side frame 5E extending in the front-rear direction, which are respectively arranged at an interval on the left side to the left vertical plate 5B and at an interval on the right side to the right vertical plate 5C, a plurality of extension beams 5F respectively that extend in the left direction from the bottom plate 5A and the left vertical plate 5B and support the left side frame 5D at the distal end and extend in the right direction from the bottom plate 5A and the right vertical plate 5C and support the right side frame 5E at the distal end, and an undercover 5G that is provided to infill a clearance between the respective extension beams 5F. The front device 4 is mounted to the front side to each of the vertical plates 5B, 5C to be capable of tilting and lifting thereto, and a counterweight 6 to be described later is mounted to the rear side to each of the vertical plates 5B, 5C.

Here, the revolving frame 5 is provided with a left rear beam 5H and a right rear beam 5J to be positioned at the end closer to the backside than the left and right extension beams 5F. The left half of the left rear beam 5H is inclined to the front side to correspond to an inclination of a left weight part 6B of the counterweight 6. Specifically, the left part of the left rear beam 5H to a heat exchanger 19 to be described later is inclined to the front side along a front surface 6B1 of the left weight part 6B. Likewise, the right part of the right rear beam 5J is inclined to the front side along a front surface 6C1 of the right weight part 6C.

The counterweight 6 is provided to extend in the left-right direction in a state of being mounted on the rear sides of the left and right vertical plates 5B, 5C forming the revolving frame 5. The counterweight 6 acts as a weight balance to the front device 4. The counterweight 6 is formed to be curved in an arc shape in such a manner as to project backward at the central position in the left-right direction.

The counterweight 6 includes a center weight part 6A that is positioned in the center of the left-right direction to cover the rear side of an engine 7 and the heat exchanger 19 to be described later, the left weight part 6B that is positioned in the left side of the left-right direction to cover the rear side of a heat exchanger upstream room 24 to be described later and the right weight part 6C that is positioned in the right side of the left-right direction to cover the rear side of a hydraulic pump 8 to be described later. Here, a rear surface 6D of the counterweight 6 is formed as an arc surface having substantially constant curvature over the center weight part 6A, the left weight part 6B and the right weight part 6C.

Figure 5:
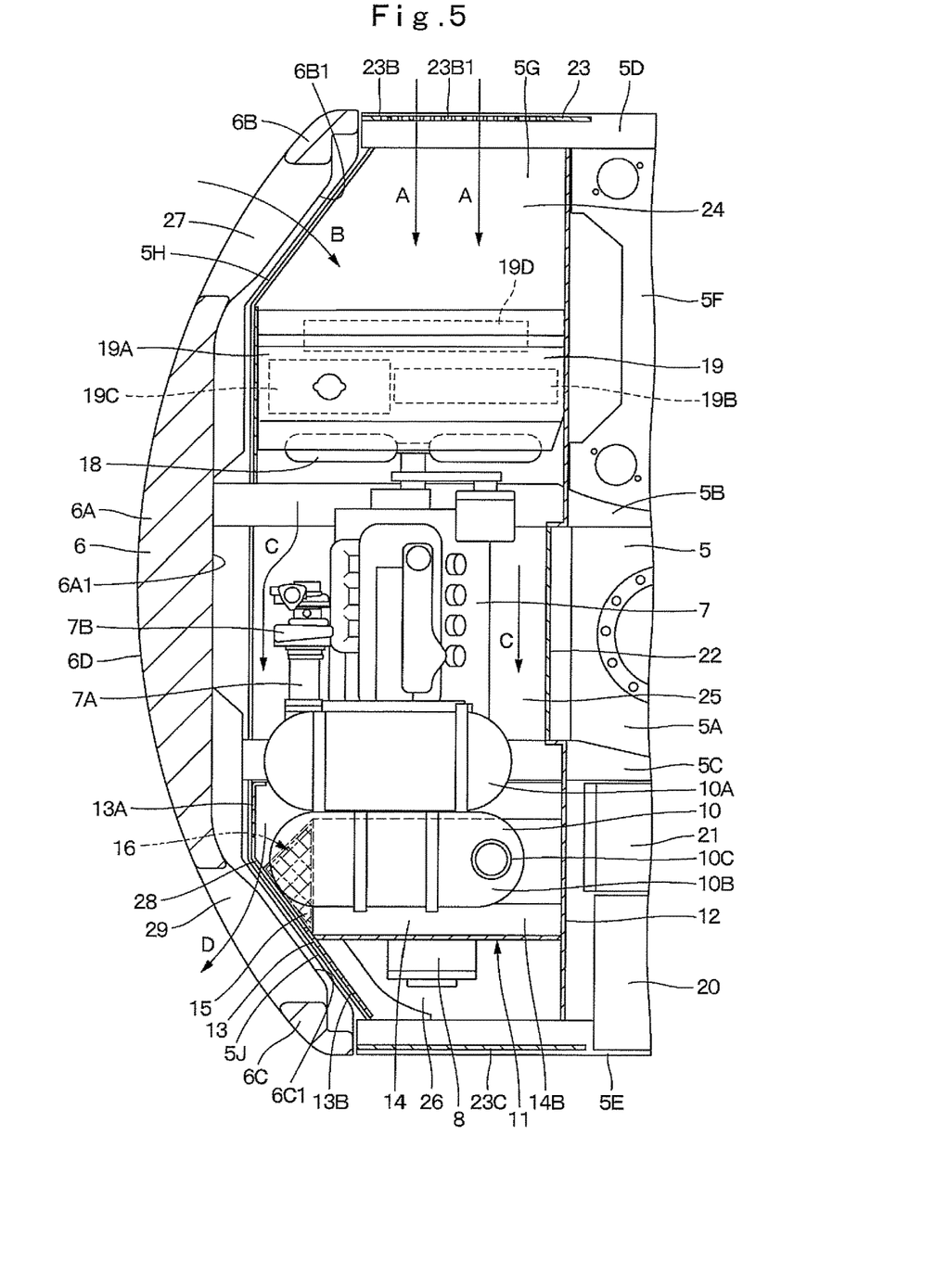
FIG. 5 is a cross sectional view showing flow of cooling air in a heat exchanger upstream room and in an engine room as enlarged in a direction of arrows V-V in FIG. 1.

As shown in FIG. 5, a front surface 6A1 of the center weight part 6A is formed to extend linearly in the left-right direction. The front surface 6B1 of the left weight part 6B is formed as an inclination surface inclined to the left front side to correspond to an inclined state of the left rear beam 5H of the revolving frame 5. On the other hand, the front surface 6C1 of the right weight part 6C is formed as an inclination surface inclined to the right front side to correspond to an inclined state of the right rear beam 5J of the revolving frame 5 and a rear surface plate 13 of a firewall 11 to be described later.

Figure 4:
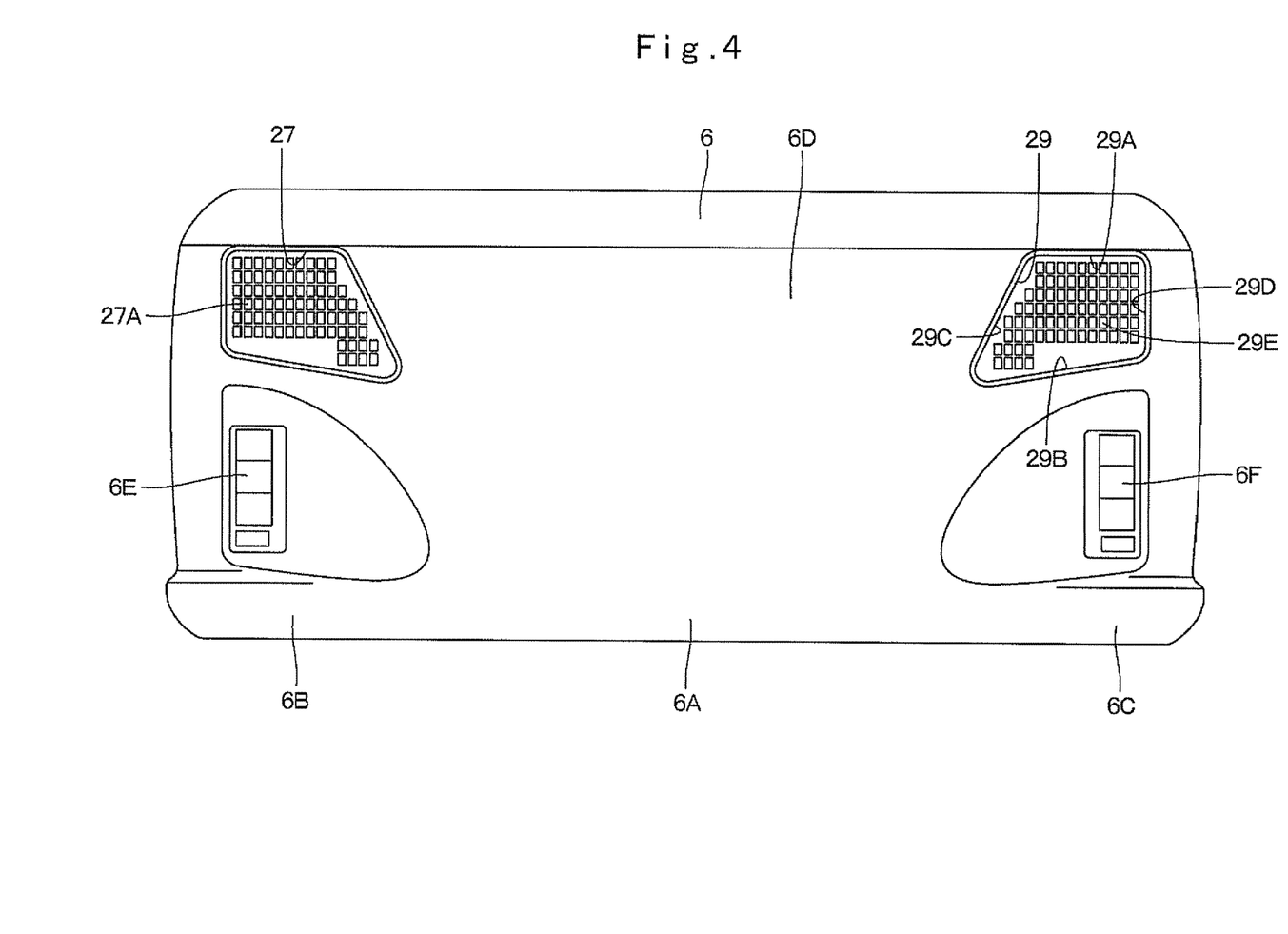
FIG. 4 is a rear view showing the counterweight as viewed from the rear side in FIG. 1.

Here, as shown in FIG. 4, a left lamp device 6E composed of a brake lamp, a winker lamp and the like is provided on a lower side position of the left weight part 6B. On the other hand, a right lamp device 6F is provided on a lower side position of the right weight part 6C. Further, an intake opening 27 to be described later is provided on an upper side position of the left weight part 6B, and an exhaust opening 29 to be described later is provided on an upper side position of the right weight part 6C.

Figure 3:
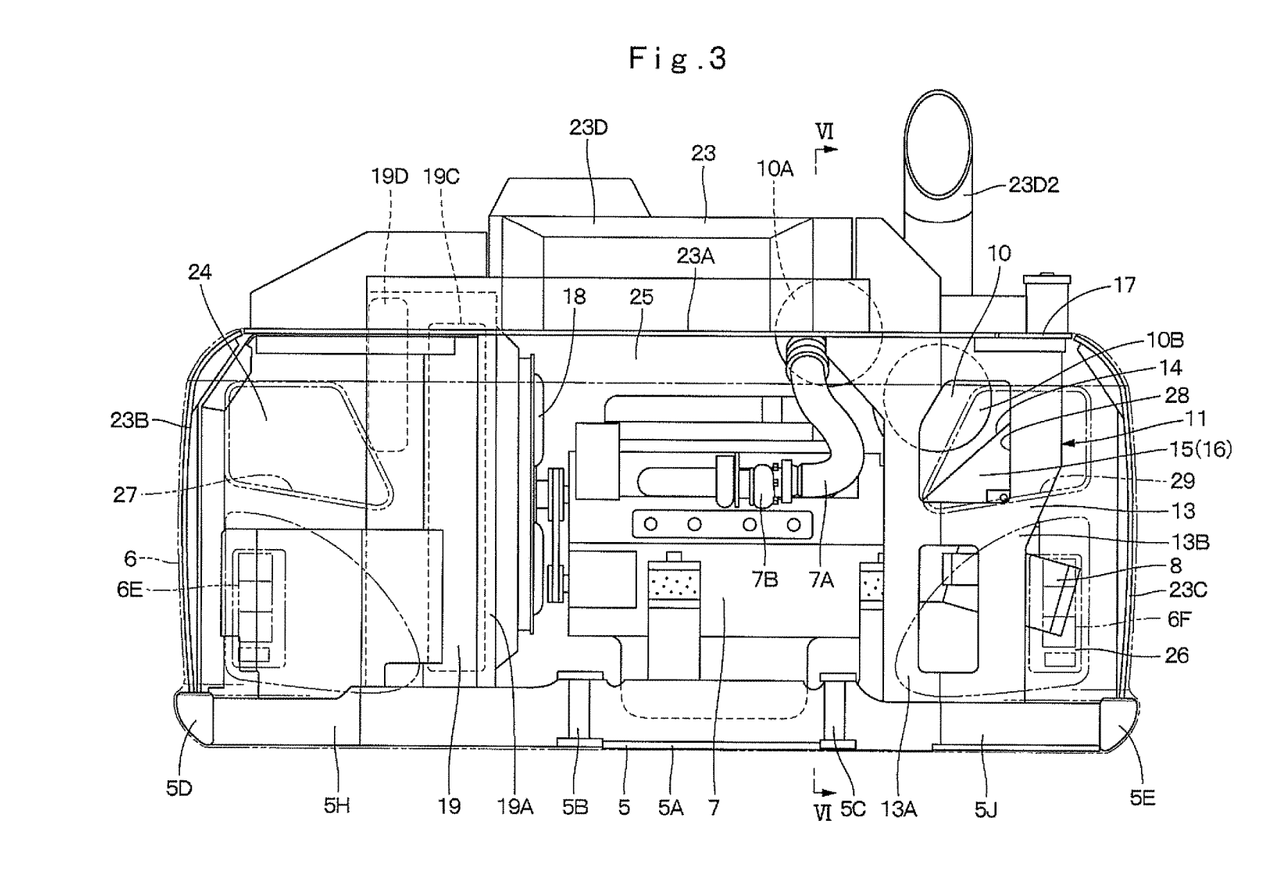
FIG. 3 is a rear view showing a rear part of the upper revolving structure with the counterweight being removed, as viewed from the rear side in FIG. 1.

As shown in FIG. 2 and FIG. 3, the engine 7 is provided on the rear side of the revolving frame 5 to be positioned in the front side to the counterweight 6. The engine 7 is mounted in a horizontal state of extending in the left-right direction. The hydraulic pump 8 to be described later is arranged on the right side as one side in the left-right direction to the engine 7.

An exhaust pipe 7A is connected to an exhaust side of the engine 7, that is, the right side in the present embodiment, and a supercharger 7B is provided on the midway section of the exhaust pipe 7A. Further, an exhaust gas post-treatment device 10 to be described later is provided downstream side of the supercharger 7B of the exhaust pipe 7A. Here, the supercharger 7B becomes in a high temperature, and therefore, is cooled by cooling air flowing in an engine room 25 to be described later.

The hydraulic pump 8 is provided on the engine 7 to be positioned on the right side as one side in the left-right direction to the revolving frame 5 and on the lower side of the exhaust gas post-treatment device 10. The hydraulic pump 8 is driven by the engine 7, thereby pressurizing and delivering hydraulic oil supplied from a hydraulic oil tank 21 to be described later. Here, the hydraulic pump 8 is mounted on one end of the engine 7 through a mounting flange 9 (refer to FIG. 6). Thereby, as shown in FIG. 3 and FIG. 5, the hydraulic pump 8 is arranged closer to the right side in the left-right direction than the firewall 11 to be described later, that is, in a pump room 26 to be described later.

The exhaust gas post-treatment device 10 is positioned on the upper side of the hydraulic pump 8 and is connected to the exhaust side of the engine 7. Specifically, the exhaust gas post-treatment device 10 is positioned closer to upper side than a partition plate 14 of the firewall 11 to be described later to be mounted on the engine 7. That is, the exhaust gas post-treatment device 10 is arranged to the engine room 25 side to be described later. Here, the exhaust gas post-treatment device 10, for example, oxidizes carbon monoxides (CO), hydrocarbons (HC) and the like contained in the exhaust gas discharged from the engine 7 to be removed, purifies nitrogen oxides (NOx) contained in the exhaust gas, and further reduces noises of the exhaust gas.

The exhaust gas post-treatment device 10 includes a first treatment section 10A to which the exhaust pipe 7A of the engine 7 is connected, a connecting line connected to the outflow side of the first treatment section 10A, a urea water injection valve (none is shown) that is provided in the connecting line and ejects urea water, and a second treatment section 10B connected to the outflow side of the connecting line.

For example, an oxidation catalyst (not shown) is accommodated in the first treatment section 10A. The oxidation catalyst causes an exhaust gas to flow therein at a predetermined temperature, thereby oxidizing carbon monoxides (CO), hydrocarbons (HC) and the like contained in the exhaust gas to be removed. In addition, the second treatment section 10B is arranged, for example, side by side with the first treatment section 10A on the right side. A urea selective reduction catalyst, an oxidation catalyst and the like (none is shown) are accommodated in the second treatment section 10B. An exhaust port 10C is provided in a rear section of the second treatment section 10B as the downstream side thereof to project in a radial upper side, and a projection end side of the exhaust port 10C is connected to a tail pipe 23D2 of an engine cover 23D constituting an exterior cover 23 to be described later (refer to FIG. 1).

Here, an exhaust gas in a high-temperature state flows in the exhaust gas post-treatment device 10 to cause various catalysts to react. Therefore, a temperature of the exhaust gas post-treatment device 10 rises in the engine room 25. Further, many various sensors are mounted on the exhaust gas post-treatment device 10 for enhancing treatment capabilities. Accordingly, it is required to cool the sensors to be prevented from being exposed to high temperatures to be damaged.

It should be noted that the urea selective reduction catalyst selectively reduces nitrogen oxides (NOx) contained in an exhaust gas discharged from the engine 7 by ammonia generated from the urea solution regularly to be decomposed into nitrogen and water. On the other hand, the oxidation catalyst oxidizes the residual ammonia remaining after reduction of the nitrogen oxides by the urea selective reduction catalyst to be decomposed into nitrogen and water.

Next, an explanation will be made of the configuration of the firewall 11 provided as a partition between the engine room 25 and the pump room 26.

The firewall 11 is positioned on the right side to the engine 7 to be arranged between the counterweight 6 and the respective tanks 20, 21 to be described later. The firewall 11 functions as the partition between the engine room 25 to be described later in which the engine 7 and the exhaust gas post-treatment device 10 are arranged and the pump room 26 in which the hydraulic pump 8 is arranged. The firewall 11 partially configures a part of the exterior cover 23 to be described later.

Figure 6:
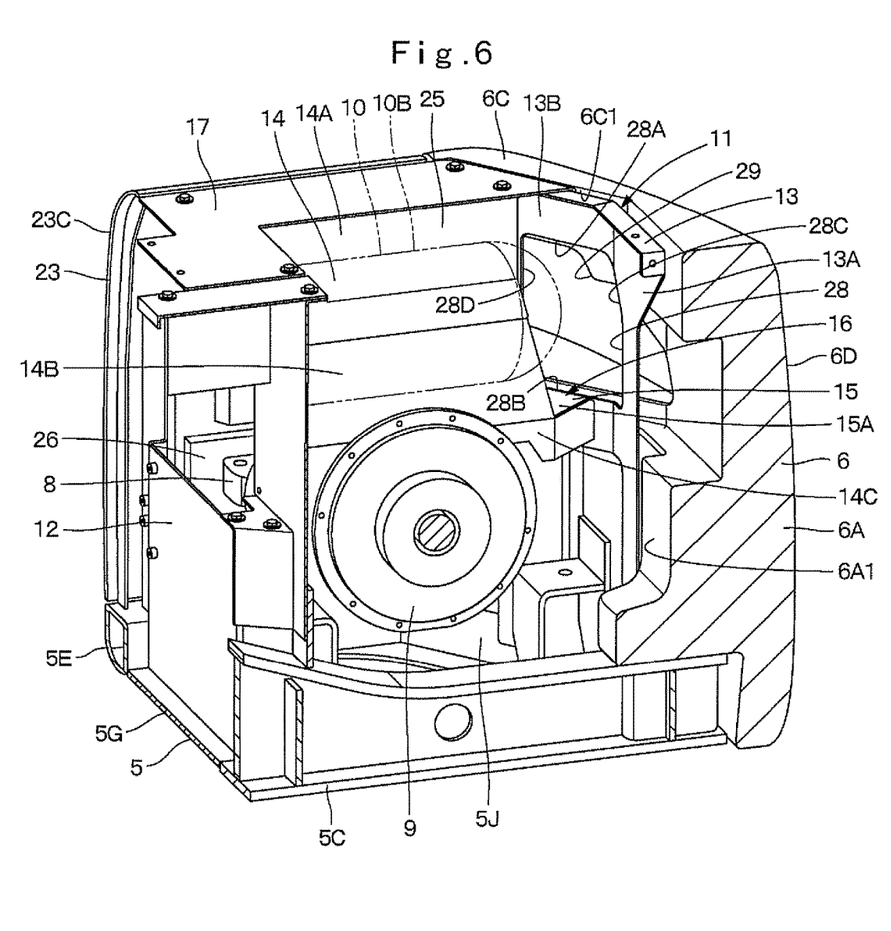
FIG. 6 is a perspective cross sectional view showing the revolving frame, the counterweight, a hydraulic pump, a firewall, an outflow opening, an exhaust opening and the like as viewed in a direction of arrows VI-VI in FIG. 3.
Figure 7:
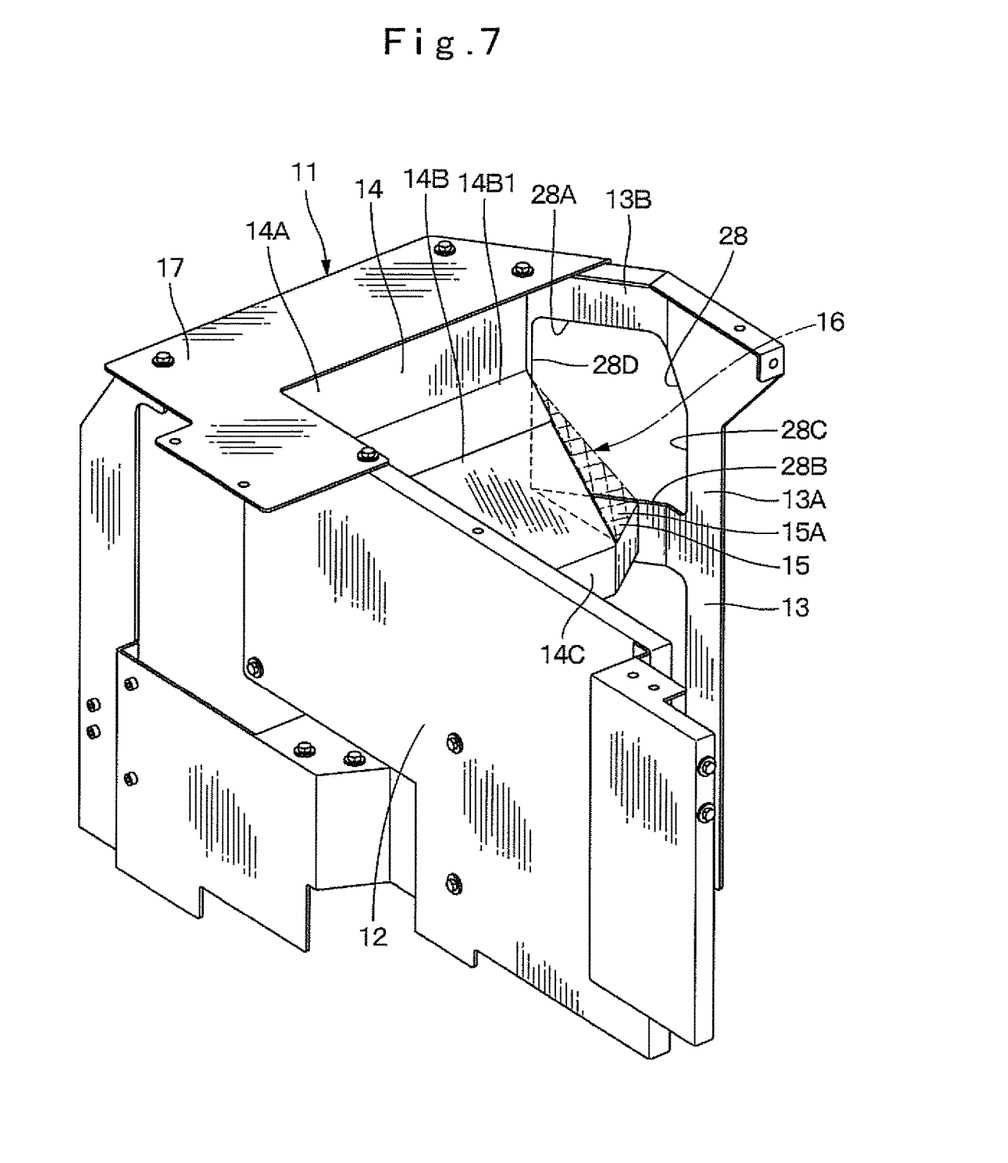
FIG. 7 is a perspective view showing the firewall in FIG. 6 in a single unit.
Figure 8:
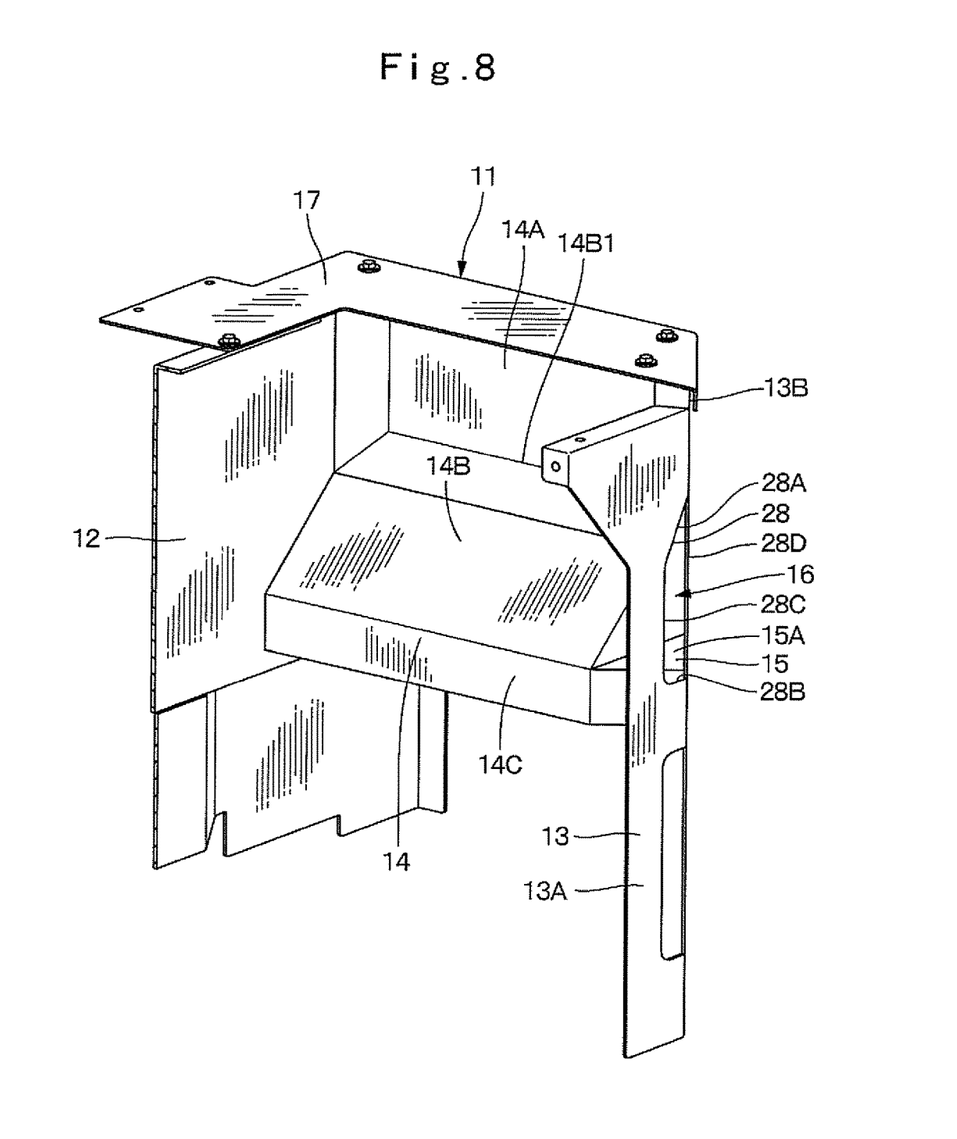
FIG. 8 is a perspective view showing the firewall in the single unit as viewed from a right oblique upper side in FIG. 7.

As shown in FIG. 6 to FIG. 8, the firewall 11 includes a front surface plate 12 that is positioned in front of the hydraulic pump 8 and is provided to rise to extend in the left-right direction, a rear surface plate 13 that is positioned in rear of the hydraulic pump 8 and is provided to rise to extend in the left-right direction to face the counterweight 6, and the partition plate 14 that is positioned between the front surface plate 12 and the rear surface plate 13 and is provided to rise to extend in the front-rear direction. It should be noted that the front surface plate 12 is formed by the structure of combining a plurality of plate members. That is, the front surface plate 12 is configured by combining the plate members adapted to shapes of the fuel tank 20 and the hydraulic oil tank 21 and an arrangement situation of tubular bodies connected to the respective tanks 20, 21. It should be noted that the front surface plate 12 may be formed by bending one sheet of plate member.

The rear surface plate 13 is arranged to face the respective front surfaces 6A1, 6C1 in a position close to the right side section of the center weight part 6A and the right weight part 6C constituting the counterweight 6. That is, as shown in FIG. 5 and FIG. 7, the rear surface plate 13 is formed by a vertical plate portion 13A extending in the left-right direction to face the front surface 6A1 of the center weight part 6A and an inclined plate portion 13B inclined forward from a right end edge of the vertical plate portion 13A to the right side. The rear surface plate 13 as thus formed corresponds to a bent shape of the right rear beam 5J of the revolving frame 5. Further, an outflow opening 28 to be described later is provided on an upper side section of the rear surface plate 13, specifically in a height position equivalent to the second treatment section 10B in the exhaust gas post-treatment device 10.

The partition plate 14 is formed as a plate body extending in the front-rear direction to be positioned between the hydraulic pump 8 and the exhaust gas post-treatment device 10. The partition plate 14 is formed by an upper vertical surface portion 14A arranged vertically to be positioned upward, an inclined surface portion 14B inclined left side (to the engine 7 side) from a lower end edge of the upper vertical surface portion 14A to the lower side, and a lower vertical surface portion 14C extending downward from a lower end edge of the inclined surface portion 14B. In this case, a rear corner part of an upper end portion 14B1 in the inclined surface portion 14B is arranged in a position close to an upper end portion 28A of the outflow opening 28 to be described later. On the other hand, a lower side section of the lower vertical surface portion 14C is arranged, for example, across a base end portion of the hydraulic pump 8 in an upper side vicinity of a boundary position between the hydraulic pump 8 and the mounting flange 9.

Here, the firewall 11 is provided with a space forming plate 15 that forms an air flow passage part 16 to cause cooling air to flow from the engine room 25 to the outflow opening 28.

The space forming plate 15 is provided between the partition plate 14 of the firewall 11 and the rear surface plate 13. The space forming plate 15 is formed such that a section thereof in a position lower than the outflow opening 28 to be described later is made to an upper surface portion 15A. That is, the space forming plate 15 is formed by extending the lower vertical surface portion 14C of the partition plate 14 to the rear side (inclined plate portion 13B). Specifically, the space forming plate 15 ensures a space above the triangle-shaped upper surface portion 15A to form the air flow passage part 16 (range shown in a lattice pattern of a dashed-dotted line in FIG. 5 and FIG. 7) for causing cooling air to flow from the engine room 25 to the outflow opening 28 between the partition plate 14 and the rear surface plate 13.

The air flow passage part 16 is formed, for example, as a rear triangular pyramid shape having the upper surface portion 15A of the space forming plate 15 as a bottom surface and a corner part of the upper end portion 14B1 of the inclined surface portion 14B in the partition plate 14 as a top portion. It should be noted that the air flow passage part 16 may be formed in a shape enabling an outflow area of the outflow opening 28 to be enlarged in such a shape as to overlap in the front-rear direction with the after-mentioned exhaust opening 29 provided in the counterweight 6, and may be formed in a shape other than the triangular pyramid.

The air flow passage part 16 enlarges an area of a flow passage communicated from the engine room 25 to the outflow opening 28 by forming a space between the outflow opening 28 and the inclined surface portion 14B of the partition plate 14. Thereby, the air flow passage part 16 can enlarge the opening area of the outflow opening 28. That is, the cooling air flowing from the engine room 25 to the outflow opening 28 goes through the air flow passage part 16, and thereby can smoothly flow out from the outflow opening 28 having a large outflow area.

Further, the firewall 11 is provide with a top surface plate 17 positioned on the right side of the upper part. The top surface plate 17 is formed to extend horizontally in the front-rear direction to connect upper parts of the front surface plate 12, the rear surface plate 13 and the partition plate 14. The top surface plate 17 forms a part of an upper surface cover 23A of the exterior cover 23 to be described later.

The firewall 11 as thus configured, for example, is bolted to the extension beam 5F corresponding to the lower part of the front surface plate 12 and the lower part of the rear surface plate 13 is bolted to the right rear beam 5J, thus being fixed on the revolving frame 5.

As shown in FIG. 3, a cooling fan 18 is provided within the engine room 25 to be positioned in the left side as the other side in the left-right direction of the revolving frame 5. The cooling fan 18 is driven by the engine 7 as a power source to suck in outside air as cooling air. The cooling air sucked by the cooling fan 18 is supplied to an oil cooler 19B, a radiator 19C, an intercooler 19D and the like in the heat exchanger 19 to be described later.

The heat exchanger 19 is provided on the revolving frame 5 to face the cooling fan 18. As shown in FIG. 5, the heat exchanger 19 is provided, for example, with the oil cooler 19B for cooling hydraulic oil, the radiator 19C for cooling cold water of the engine 7, and the intercooler 19D for cooling the air pressurized by the supercharger 7B within an angular frame-shaped support frame 19A.

As shown in FIG. 2, the fuel tank 20 is mounted on the right side to the revolving frame 5 to be positioned in front of the front surface plate 12 of the firewall 11. The fuel tank 20 reserves fuel to be supplied to the engine 7, and is formed as a cuboid-shaped reservoir.

The hydraulic oil tank 21 is mounted on the revolving frame 5 to be positioned on the left side adjacent to the fuel tank 20. The hydraulic oil tank 21 reserves the hydraulic oil to be pressurized and supplied to various actuators, and is formed as a cuboid-shaped reservoir.

As shown in FIG. 2 and FIG. 5, a front wall plate 22 is positioned in front of the engine 7 and is provided to rise on the revolving frame 5 to extend in the left-right direction. The front wall plate 22 extends to a position of a left surface cover 23B of the exterior cover 23 to be described later through a front surface of the support frame 19A of the heat exchanger 19 from the left end of the front surface plate 12 in the firewall 11.

The exterior cover 23 is positioned in front of the counterweight 6 to cover the engine 7, the hydraulic pump 8, the exhaust gas post-treatment device 10 and the heat exchanger 19. As shown in FIG. 3, the exterior cover 23 includes the upper surface cover 23A that covers an upward side of the engine 7, the heat exchanger 19 and the like, the left surface cover 23B that rises down to face the heat exchanger 19 from the left end of the upper surface cover 23A, and the right surface cover 23C that rises down from the right end of the upper surface cover 23A. The exterior cover 23 has the engine cover 23D projecting closer to the upper side than the upper surface cover 23A. The engine cover 23D covers the exhaust gas post-treatment device 10, the heat exchanger 19 and the like projecting closer to the upper side than the upper surface cover 23A.

The left surface cover 23B is provided with an air flow port 23B1 for sucking in outside air. As shown in FIG. 1, an exhaust port 23D1 is provided in the right side position of the engine cover 23D to discharge cooling air to an exterior from the engine room 25. Further, the engine cover 23D is provided with a tail pipe 23D2 projecting upward, and the tail pipe 23D2 is communicated with the exhaust port 10C of the exhaust gas post-treatment device 10.

Here, a description will be made of a space surrounded by the revolving frame 5, the exterior cover 23 and the like, a partition structure and a space divided by the partition structure.

The heat exchanger upstream room 24 is a space positioned in the most upstream side in a flow direction of cooling air by the cooling fan 18. The heat exchanger upstream room 24 is positioned upstream of the heat exchanger 19, and is surrounded by the undercover 5G of the revolving frame 5, the left weight part 6B of the counterweight 6, the heat exchanger 19, the front wall plate 22 and the exterior cover 23.

The engine room 25 is a space for flow of the cooling air having passed through the heat exchanger 19. The engine room 25 is surrounded by the revolving frame 5, the center weight part 6A of the counterweight 6, the firewall 11, the heat exchanger 19, the front wall plate 22 and the exterior cover 23. The engine 7, the exhaust gas post-treatment device 10 and the like are arranged in the engine room 25.

The pump room 26 is a space separated from the engine room 25 by the firewall 11. The pump room 26 is surrounded by the revolving frame 5, the right weight part 6C of the counterweight 6, the firewall 11, and the exterior cover 23. The hydraulic pump 8 is arranged in the pump room 26.

An intake opening 27 is provided in an upper side position of the left weight part 6B constituting the counterweight 6. The intake opening 27 penetrates through the rear surface 6D from the front surface 6B1 of the left weight part 6B to be communicated with the heat exchanger upstream room 24. The intake opening 27 is a passage for causing more outside air to be sucked into the heat exchanger upstream room 24. In addition, the intake opening 27 is provided with dust protective screen 27A that suppress outside dusts from entering into the heat exchanger upstream room 24 together with air. The dust protective screen 27A is formed by a plate member subjected to hole machining, a mesh material or the like. The dust protective screen 27A can trap foreign objects (paper dusts, leaves, insects and the like) that would enter into the engine room 25 from the intake opening 27, and can suppress foreign objects from entering into the engine room 25.

Next, an explanation will be made of the configuration and function of the outflow opening 28 and the exhaust opening 29 according to the present embodiment.

As shown in FIG. 7, the outflow opening 28 is provided on the rear surface plate 13 of the firewall 11. The outflow opening 28 causes the cooling air sucked into the engine room 25 to flow out toward the counterweight 6 (exhaust opening 29). The outflow opening 28 is arranged in the upper side section of the rear surface plate 13, specifically in a height position equivalent to the second treatment section 10B in the exhaust gas post-treatment device 10.

The outflow opening 28 is formed as a quadrilateral opening having the upper end portion 28A, a lower end portion 28B, a left end portion 28C, and a right end portion 28D. In this case, the lower end portion 28B of the outflow opening 28 is arranged in substantially the same height with the upper surface portion 15A of the space forming plate 15 provided on the rear surface plate 13. Here, the outflow opening 28 is provided with the air flow passage part 16 at the front side, and thereby can be arranged to be separated from the inclined surface portion 14B of the partition plate 14 and can largely open without interruption of the inclined surface portion 14B.

Further, since the rear surface plate 13 on which the outflow opening 28 is formed is arranged to make close contact with the front surface 6C1 of the right weight part 6C constituting the counterweight 6, the hydraulic oil does not enter into the engine room 25 through the outflow opening 28 from the pump room 26.

As shown in FIG. 5 and FIG. 6, the exhaust opening 29 is provided in the upper side position of the right weight part 6C constituting the counterweight 6. The exhaust opening 29 is an opening for discharging the cooling air having flowed from the outflow opening 28 to an exterior. The exhaust opening 29 opens to a position facing the outflow opening 28. Thereby, the exhaust gas post-treatment device 10 (second treatment section 10B), the outflow opening 28 and the exhaust opening 29 are arranged in a position to overlap in the front-rear direction of the revolving frame 5. As a result, the cooling air having flowed on the periphery of the exhaust gas post-treatment device 10 is discharged to an exterior through the outflow opening 28 and the exhaust opening 29.

The exhaust opening 29 penetrates through the rear surface 6D from the front surface 6C1 of the right weight part 6C. In this case, the exhaust opening 29 is formed as a quadrilateral (trapezoidal) opening having an upper end portion 29A, a lower end portion 29B, a left end portion 29C and a right end portion 29D. The exhaust opening 29 is arranged in substantially the same height range with the height range of the outflow opening 28 (dimension in the upper-lower direction between the upper end portion 28A and the lower end portion 28B). Here, since the exhaust opening 29 opens horizontally to the rear surface 6D of the vertical counterweight 6, the exhaust opening 29 can suppress rain waters and dusts from entering therein as compared to a case of opening upward on the upper surface and the like.

Further, the exhaust opening 29 is provided with dust protective screen 29E that suppress outside dusts from entering into the engine room 25 together with air. The dust protective screen 29E, as similar to the dust protective screen 27A of the intake opening 27, is formed by a plate member subjected to hole machining, a mesh material or the like. The dust protective screen 29E can trap foreign objects (paper dusts, leaves, insects and the like) that would enter into the engine room 25 from the exhaust opening 29, and can suppress foreign objects from entering into the engine room 25.

It should be noted that a cab 30 is mounted on the left front side of the revolving frame 5. The cab 30 is provided for an operator to get in, and accommodates therein an operator's seat on which the operator sits, an operating lever for traveling, an operating lever for working and the like (none is shown).

The hydraulic excavator 1 according to the present embodiment has the aforementioned configuration. Next, an explanation will be made of an operation of the hydraulic excavator 1.

An operator gets in the cab 30 and is seated on an operator's seat. In this state, the operator starts the engine 7 and operates the operating lever for traveling, thereby making it possible to drive the lower traveling structure 2 and cause the hydraulic excavator 1 to travel forward or backward. On the other hand, the operator who is seated on an operator's seat operates the operating lever for working, thus making it possible to tilt and lift the front device 4 to perform an excavating work of earth and sand, and the like.

As described above, when the hydraulic excavator 1 is working, the cooling air is supplied to cooling targets of the heat exchanger 19 and the like by the cooling fan 18 of the engine 7. Therefore, an explanation will be made of flow of the cooling air in the exterior cover 23 with reference to FIG. 5.

When the cooling fan 18 rotates, as shown in an arrow A, outside air is sucked as cooling air into the heat exchanger upstream room 24 through the air flow port 23B1 provided in the left surface cover 23B of the exterior cover 23. At this time, as shown in an arrow B, outside air is sucked as cooling air into the heat exchanger upstream room 24 from the intake opening 27 of the counterweight 6 as well. Thereby, since a great deal of cooling air can be supplied to the heat exchanger 19, the fluid of the hydraulic oil, the engine cooling water and the like can be cooled.

The cooling air having flowed into the engine room 25 passing through the heat exchanger 19, as shown in an arrow C, flows on the periphery of the engine 7, the exhaust gas post-treatment device 10 and the like, and cools them. A part of the cooling air having passed through the engine 7, the exhaust gas post-treatment device 10 and the like is discharged to an exterior from the exhaust port 23D1 of the engine cover 23D. In addition, another part of the cooling air is discharged to an exterior from an opening provided in the undercover 5G of the revolving frame 5. At this time, when the firewall 11 cuts in between the engine room 25 and the pump room 26, even in a case where the hydraulic oil leaks on the periphery of the hydraulic pump 8, the firewall 11 can prevent the leaked hydraulic oil from spreading out to the engine room 25 side.

Here, in recent hydraulic excavators, for meeting exhaust gas regulations of a high standard, the exhaust gas post-treatment device is large-sized, and sensors mounted on the exhaust gas post-treatment device increase in number for the hydraulic excavator to be complicated as a whole. In this case, the large-sized exhaust gas post-treatment device is caused to increase in heat quantity to make a wide range of the periphery a high temperature, and besides, temperatures of the sensors are increased by the heat of the exhaust gas post-treatment device.

Therefore, according to the present embodiment, the rear surface plate 13 of the firewall 11 is provided with the outflow opening 28 for causing the cooling air sucked in the engine room 25 to flow out toward the counterweight 6. In addition, the right weight part 6C of the counterweight 6 is provided with the exhaust opening 29 in a position facing the outflow opening 28 for discharging the cooling air having flowed out from the outflow opening 28 to an exterior.

Accordingly, the cooling air having flowed on the periphery of the exhaust gas post-treatment device 10, as shown in an arrow D, can be discharged to an exterior through the outflow opening 28 provided in the firewall 11 and the exhaust opening 29 provided in the counterweight 6. In this case, since the outflow opening 28 and the exhaust opening 29 opens to the vicinity of the exhaust gas post-treatment device 10, the cooling air which has increased in temperature by cooling the exhaust gas post-treatment device 10 can be smoothly discharged. In this way, when the exhaust ports of the cooling air increase in number by the outflow opening 28 and the exhaust opening 29, a flow amount of the cooling air used for cooling each component can increase.

As a result, it is possible to cause a great deal of the cooling air to flow on the periphery of the engine 7 and the exhaust gas post-treatment device 10 in the engine room 25 to cool the exhaust gas post-treatment device 10. Therefore, it is possible to achieve a reduction of heat influence on the periphery and an increase on durability of electronic equipment of sensors and the like.

The outflow opening 28 and the exhaust opening 29 are provided to be positioned in back of (on the right side to) the engine 7. Accordingly, it is possible to cause the cooling air to actively flow in the rear side position toward the outflow opening 28 and the exhaust opening 29 in the engine room 25. Thereby, the supercharger 7B which becomes high temperature by the exhaust gas can be intensively cooled by the cooling air flowing close to the rear side of the engine room 25.

The outflow opening 28 and the exhaust opening 29 open in the vicinity of the exhaust gas post-treatment device 10 can release the heat of the exhaust gas post-treatment device 10 to an exterior even in a case where the cooling fan 18 stops by an operation stop. This can eliminate stay of heat in the engine room 25 to lower temperatures of the surrounding devices.

Further, the exhaust opening 29 is provided to open sideways to the rear surface 6D of the vertical counterweight 6. Accordingly, as compared to a case where the exhaust opening 29 opens upward on an upper surface or the like, it is possible to suppress rain waters and dusts from entering therein and keep the engine room 25 to be internally clean.

In addition, the exhaust gas post-treatment device 10, the outflow opening 28 and the exhaust opening 29 are arranged in a position to overlap in the front-rear direction of the revolving frame 5. Thereby, the cooling air having flowed on the periphery of the exhaust gas post-treatment device 10 can be discharged to an exterior through the outflow opening 28, the exhaust opening 29 to efficiently cool the exhaust gas post-treatment device 10 with a smooth flow of the cooling air.

The firewall 11 includes the front surface plate 12 that is positioned in front of the hydraulic pump 8 and is provided to rise to extend in the left-right direction, the rear surface plate 13 that is positioned in rear of the hydraulic pump 8 and is provided to rise to extend in the left-right direction to face the counterweight 6, and the partition plate 14 that is positioned between the front surface plate 12 and the rear surface plate 13 to extend in the front-rear direction and is provided as the partition between the engine room 25 and the pump room 26. The rear surface plate 13 is provided with the outflow opening 28. Besides, the firewall 11 is provided with the space forming plate 15 that is positioned between the partition plate 14 and the rear surface plate 13 and has the upper surface portion 15A lower than the outflow opening 28. Thereby, it is possible to form the air flow passage part 16 between the partition plate 14 and the rear surface plate 13 for causing the cooling air to flow from the engine room 25 toward the outflow opening 28 by the space forming plate 15.

Accordingly, the air flow passage part 16 can enlarge an opening area of the outflow opening 28 by widening an area of the flow passage communicated with the outflow opening 28. As a result, the air flow passage part 16 can cause the cooling air in the engine room 25 to smoothly flow toward the outflow opening 28, and can increase a flow amount of the cooling air in this point as well.

On the other hand, the heat exchanger upstream room 24 surrounded by the revolving frame 5, the counterweight 6, the heat exchanger 19 and the exterior cover 23 is provided in the position upstream of the heat exchanger 19 in the flow direction of the cooling air by the cooling fan 18. Besides, the counterweight 6 is provided with the intake opening 27 in the position communicated with the heat exchanger upstream room 24 for sucking outside air. Accordingly, the intake opening 27 can suck in a great deal of air as the cooling air since the intake opening 27 enlarges the opening for causing the outside air to be sucked into the heat exchanger upstream room 24.

Further, the exhaust opening 29 of the counterweight 6 is provided with the dust protective screen 29E that suppress outside dusts from entering therein. Thereby, the dust protective screen 29E can trap foreign objects (paper dusts, leaves, insects and the like) that would enter into the engine room 25 from the exhaust opening 29, and can suppress foreign objects from entering into the engine room 25.

It should be noted that the embodiment is explained by taking a case where the counterweight 6 is provided with the intake opening 27 for sucking the outside air, as an example. However, the present invention is not limited thereto, but the intake opening 27 may be eliminated from the counterweight 6.

The embodiment is explained by taking the wheel type hydraulic excavator 1 as a construction machine, as an example. However, the present invention is not limited thereto, but may be applied widely to other construction machines such as a crawler type hydraulic excavator and a hydraulic crane.

DESCRIPTION OF REFERENCE NUMERALS

1: Hydraulic excavator (Construction machine)
3: Upper revolving structure
4: Front device
5: Revolving frame (Vehicle body frame)
6: Counterweight
7: Engine
8: Hydraulic pump
10: Exhaust gas post-treatment device
11: Firewall
12: Front surface plate
13: Rear surface plate
14: Partition plate
15: Space forming plate
15A: Upper surface portion
16: Air flow passage part
18: Cooling fan
19: Heat exchanger
23: Exterior cover
24: Heat exchanger upstream room
25: Engine room
26: Pump room
27: Intake opening
28: Outflow opening
29: Exhaust opening
29E: Dust protective screen

The invention claimed is:

1. A construction machine comprising:
a vehicle body frame that is formed as a support structure;
a counterweight that is provided in a rear end to said vehicle body frame for acting as a weight balance to a front device;
an engine that is positioned in a front side to said counterweight and is mounted on said vehicle body frame extending in a horizontal state;
a hydraulic pump that is provided to be positioned on one side of a front-rear direction of said vehicle body frame;
an exhaust gas post-treatment device that is connected to an exhaust gas side of said engine to be positioned above said hydraulic pump, and performs post-treatment of an exhaust gas discharged from said engine;
a firewall that is provided as a partition between an engine room in which said engine and said exhaust gas post-treatment device are arranged and a pump room in which said hydraulic pump is arranged;
a cooling fan that is provided in said engine room to be positioned on an other side of the front-rear direction of said vehicle body frame, and sucks in outside air as cooling air;
a heat exchanger that is provided on said vehicle body frame to face said cooling fan and cools fluid with the cooling air sucked by said cooling fan; and
an exterior cover that is positioned in front of said counterweight to cover said engine, said hydraulic pump, said exhaust gas post-treatment device and said heat exchanger, wherein
said firewall includes a front surface plate mounted to be positioned in front of said hydraulic pump, a rear surface plate that is positioned in rear of said hydraulic pump and is provided to face said counterweight, and a partition plate that is positioned between said hydraulic pump and said exhaust gas post-treatment device and provided by being extended between said front surface plate and said rear surface plate,
said rear surface plate is provided with an outflow opening for outflow of the cooling air sucked in said engine room toward said counterweight, in a height position equivalent to said exhaust gas post-treatment device,
said counterweight includes an exhaust opening in a position facing said outflow opening to discharge the cooling air flowing out from said outflow opening to an exterior,
said firewall is provided with a space forming plate that is positioned between said partition plate and said rear surface plate and said space forming plate has an upper surface portion lower than said outflow opening, and
an air flow passage part is formed between said partition plate and said rear surface plate for causing the cooling air to flow from said engine room toward said outflow opening by said space forming plate.

2. The construction machine according to claim 1, wherein
said exhaust gas post-treatment device, said outflow opening and said exhaust opening are arranged in a position to overlap in the front-rear direction of said vehicle body frame.

3. The construction machine according to claim 1, wherein
said exhaust opening of said counterweight is provided with a dust protective screen that suppresses outside dusts from entering therein.

* * * * *